March 15, 1949.    R. M. NURNEY    2,464,525
COLLAPSIBLE DOLLY FOR BOATS AND THE LIKE
Filed Oct. 10, 1947    2 Sheets-Sheet 1

INVENTOR.
Raymond M. Nurney
BY
McMorrow, Berman & Davidson
Attorneys

March 15, 1949.  R. M. NURNEY  2,464,525
COLLAPSIBLE DOLLY FOR BOATS AND THE LIKE
Filed Oct. 10, 1947  2 Sheets-Sheet 2
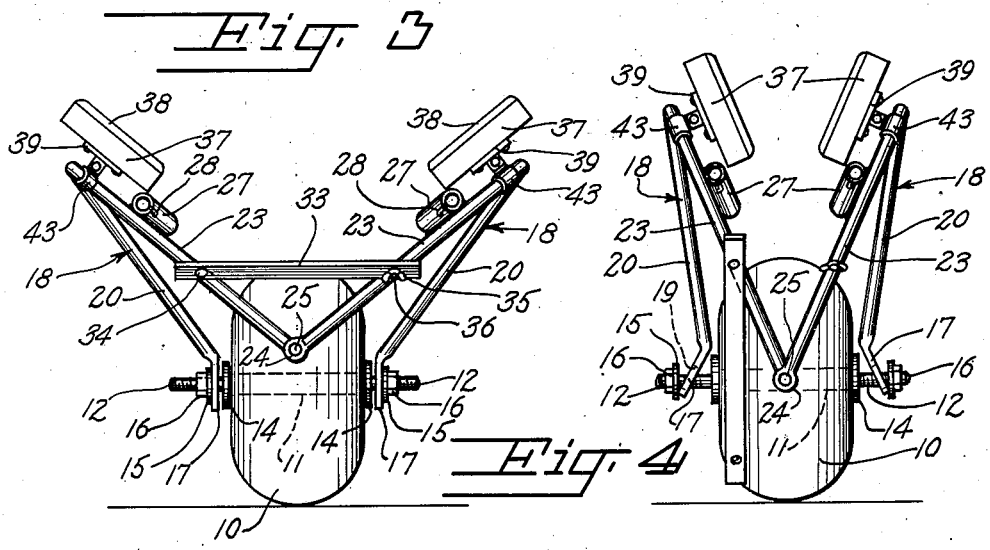
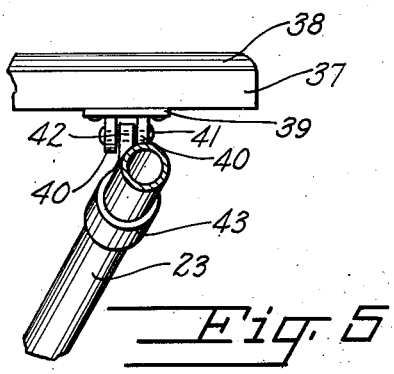
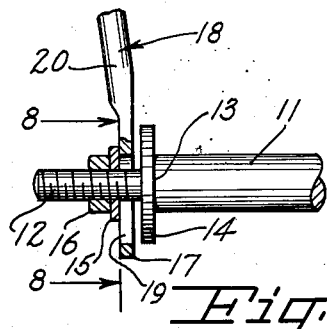
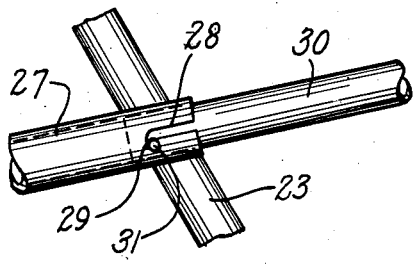
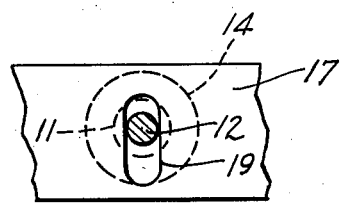
INVENTOR.
Raymond M. Nurney
BY
McMorrow, Berman & Davidson
Attorneys Patented Mar. 15, 1949

2,464,525

UNITED STATES PATENT OFFICE 2,464,525

COLLAPSIBLE DOLLY FOR BOATS AND THE LIKE

Raymond M. Nurney, Sacramento, Calif.

Application October 10, 1947, Serial No. 779,187

3 Claims. (Cl. 280—42)

My invention relates to a collapsible dolly for boats, and the like.

An important object of the invention is to provide a collapsible dolly for small boats, which can easily be manipulated by one person.

A further object of my invention is to provide a collapsible dolly primarily adapted for use in moving boats, but capable of various other uses, such as moving camping equipment, boxes, luggage, and the like.

A further object is to provide a device of the above mentioned class which is extremely simplified in design, comprising few parts, and which will occupy a minimum of space when collapsed, or stored away.

A still further object is to provide a collapsible dolly which is light and strong, yet quite inexpensive to manufacture.

Other objects and advantages of the invention will be apparent during the course of the following description.

In the accompanying drawings, forming a part of this application, and in which like numerals are employed to designate like parts throughout the same.

Figure 3 is an end elevation of the dolly with the handles removed.

Figure 4 is a similar view showing the dolly in a collapsed position.

Figure 5 is a fragmentary side elevation showing the attachment of a bolster to a frame member.

Figure 6 is a fragmentary detail view showing how handles are connected to the dolly.

Figure 7 is an enlarged fragmentary detail view of an axle and parts mounted thereon.

Figure 8 is a fragmentary vertical section taken on line 8—8 of Figure 7.

Figure 1:
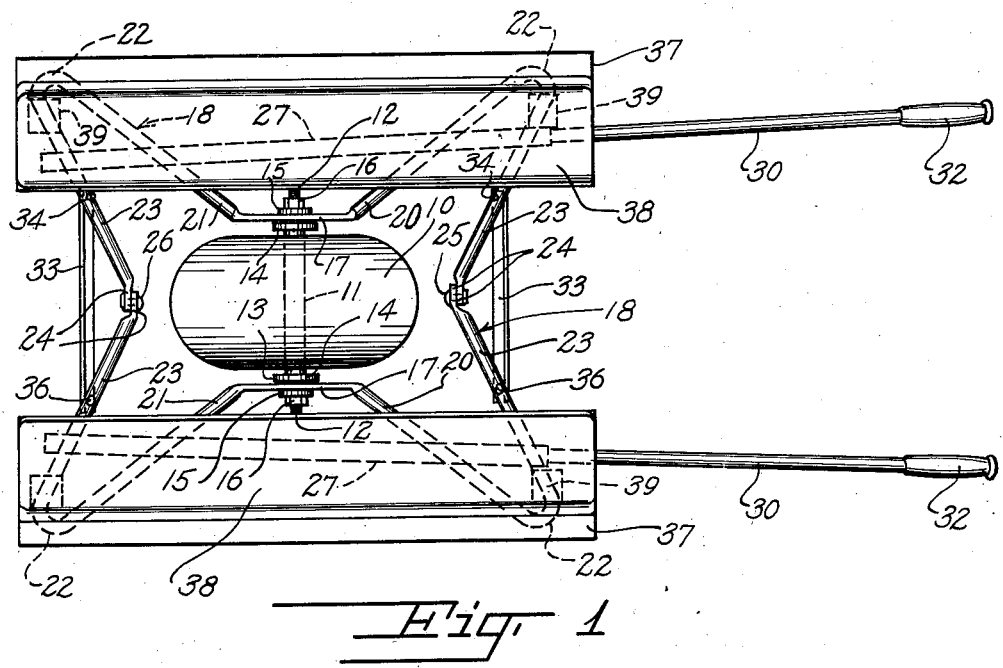
Figure 1 is a plan view of the dolly embodying the invention.

In the drawings, where for the purpose of illustration is shown a preferred embodiment of the invention, the numeral 10 designates a balloon-tired ground-engaging wheel, freely rotatably mounted upon a horizontal shaft or axle 11. This shaft 11 has receded screw-threaded end extensions 12, forming lateral shoulders 13. Each extension 12 carries an inner large washer 14, an outer washer 15, and a nut 16. Disposed between the washers 14 and 15, of each extension 12 is the horizontal flattened portion 17 of a frame member 18. The frame members 18 are identical, and each member is supported by the axle 11, as shown. Each flattened portion 17 has an elongated vertical opening or slot 19 formed therein, to pivotally receive the adjacent axle extension 12 therein. The width of each slot 19 is slightly greater than the diameter of each axle extension 12.

Figure 2:
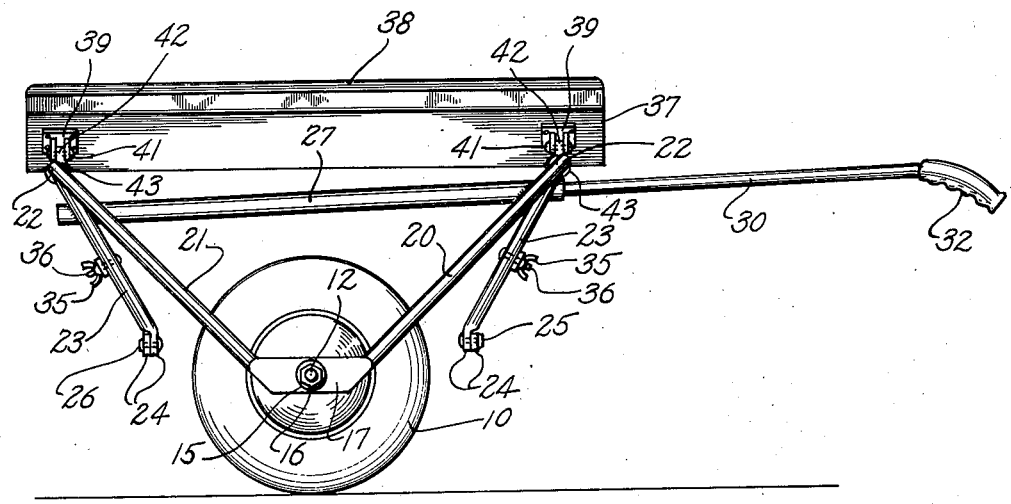
Figure 2 is a side elevation of the same.

Each of the frame members 18 further comprises front and rear longitudinally inclined tubular members or bars 20 and 21, which converge toward their lower ends and are integral with the flattened portion 17. The bars 20 and 21 also extend outwardly laterally from the wheel 10, and are inclined outwardly therefrom, Figure 3. The tops of the bars 20 and 21 project above the top of the wheel 10, and the bars 20 and 21 are bent to form top loops 22, the inner ends of which carry straight downwardly extending tubular bars 23. The bars 23 are inclined, and converge toward their lower ends as viewed in Figures 2 and 3. The bottom ends of the bars 23 are flattened, as at 24, and these ends 24 of the frame members 18 are hingedly connected, as at 25 and 26. The forward and rear loops 22 are spaced equidistantly from the axle 11.

Rigidly secured to the front and rear bars 23 of each frame member 18, by means of welding, or the like, is a longitudinal tubular member or brace 27. Each brace 27 is substantially horizontal and is connected to the bars 23 near the top loops 22, Figure 2. The braces 27 may incline downwardly slightly, toward their rear ends, Figure 2, and they preferably converge longitudinally toward such ends, Figure 1. At their forward ends, each brace 27 is provided with an inwardly disposed longitudinal L-shaped slot 28, including a downwardly extending leg or portion 29. The forward ends of the tubular braces 27 receive straight tubular handles 30, of the wheel-barrow type. Each handle 30 carries a laterally projecting lug or pin 31, near its inner end, and adapted to enter the slot 28 and to seat in the bottom of the slot portion 29, to maintain the handle 30 connected to the brace 27, Figure 6. Each handle is curved downwardly at its outer end, and provided with a rubber handle grip 32, or the like.

Horizontal straps or braces 33 are provided for the front and rear bars 23. One end of each strap 33 is permanently pivotally connected to the adjacent bar 23 of one frame section 18, as at 34. The opposite end of each strap 33 is detachably connected with the adjacent bar 23 of the opposite frame section 18, by means of wing nuts 35, which have screw threaded engagement with studs 36, carried by the bars 23 of one frame section 18.

Longitudinal bolsters or pivoted seats 37 are mounted upon the tops of the two frame sections 18. These bolsters 37 are horizontal and parallel, as viewed in Figures 1 and 2. Each bolster has its top covered by suitable padding 38. Near its opposite ends, the bottom side of each bolster 37 is provided with a depending bracket 39, rigidly mounted thereon. Each bracket 39 has depending lugs 40 having openings to receive a hinge pin 41 therein. Disposed between the lugs 40 of each bracket 39 is an upstanding lug 42 of a tubular bracket 43 rigidly mounted upon each bar 23, near the upper end of the same, as shown. Each lug 42 has an opening to pivotally receive the pin 41 therein. The longitudinal axes of the hinge pins 41 are disposed longitudinally of the bolsters 37, so that the bolsters are free to pivot laterally with respect to the dolly.

In use, the dolly may be employed to move a variety of articles. It is particularly well adapted to carry small boats such as canoes, rowboats, and the like. The dolly may be set up for use, as in Figures 1 to 3, and the bottom of the boat to be carried is placed upon the padded bolsters 37. The bolsters will adjust themselves to the lateral contour of any boat bottom, by virtue of their pivoted mounting. When the boat is in place, one end of the same may be grasped for pushing, and the dolly will serve to transport the boat to the desired spot. In the case of a boat it is not necessary to use the handles 30, and the same may remain disconnected, if desired. Also, while a boat is being moved, it is not necessary that the pivoted straps 33 be attached at both ends. These straps 33 merely serve to prevent the dolly from assuming the folded or collapsed position, Figure 3, while in use as a wheelbarrow, as this could not occur while a boat was being supported, due to the weight of the same. A plank, or the like, may be placed upon the straps 33 when they are in their positions of Figure 3, and the dolly may then be used like a wheelbarrow to carry various things. The handles 30 are attached during this latter type of use.

When it is desired to collapse the dolly, for placing the same in a boat, or the like, it is merely necessary to loosen the axle nuts 16, until they are near the outer ends of the extensions 12, Figure 4. The wing nuts 35 holding the straps 33 are removed, and the straps are allowed to hang free. The frame sections 18 may then be swung upwardly to their positions of Figure 4. The slots 19 in the flattened portions 17 permit this collapsing of the frame members 18. When thus collapsed, the dolly is relatively flat, and can be easily handled or stowed away.

It is to be understood that the form of my invention, herewith shown and described is to be taken as a preferred example of the same, and that various changes in the shape, size and arrangement of parts may be resorted to, without departing from the spirit of the invention, or the scope of the subjoined claims.

Having thus described the invention, I claim:

1. In a collapsible dolly, a wheel, an axle for the wheel, said axle including end extensions, opposed frame sections including hingedly connected inner ends mounted upon the end extensions, each frame section including a flattened portion having a substantially vertical slot to pivotally receive the end extensions therein, and clamping means adjustably mounted upon the end extensions to engage the flattened portion and permitting the frame sections to move from open to closed positions.

2. A collapsible dolly, comprising a wheel, an axle for the wheel, frame members supported by the axle and projecting upwardly and diverging outwardly therefrom, the frame members including parts hingedly connected so that the frame members may swing vertically, longitudinal braces secured to the frame members near their tops, longitudinal bolsters pivotally connected to the tops of the frame members, handles detachably connected to said braces, and means to limit the vertical swinging movement of the frame members.

3. A collapsible dolly, comprising a wheel having an axle extending upon opposite sides of the wheel, opposed frame sections arranged upon opposite sides of the wheel, each frame section including a relatively short longitudinal portion supported by the axle and adjustably pivotally connected with the axle so that the frame sections may be swung vertically from open to closed positions, forwardly and rearwardly extending upwardly inclined diverging bars secured to the ends of each longitudinal portion and having their outer ends terminating above the wheel and forwardly and rearwardly thereof respectively, and bars secured to the outer ends of the first-named bars and extending laterally inwardly and converging and having their inner ends disposed substantially at the lateral center of the wheel and near the periphery of the wheel, the inner ends of the last-named bars being pivotally connected, the arrangement being such that the opposed frame section substantially enclose the wheel, and means to lock the opposed frame sections against relative vertical swinging movement.

RAYMOND M. NURNEY.

REFERENCES CITED

The following references are of record in the file of this patent:

UNITED STATES PATENTS

| Number | Name | Date |
| --- | --- | --- |
| 704,426 | Allen | July 8, 1902 |
| 2,422,331 | Bates | June 17, 1947 |
| 2,429,028 | Neeley | Oct. 14, 1947 |